US012417019B1

United States Patent
Czenczek et al.

(10) Patent No.: US 12,417,019 B1
(45) Date of Patent: Sep. 16, 2025

(54) ISOLATION OF PROCESSES USING SHARED MEMORY FOR COMMUNICATION

(71) Applicant: Red Hat, Inc., Raleigh, NC (US)

(72) Inventors: Hanna Sophie Czenczek, Grasbrunn (DE); Stephen Coady, Dublin (IE)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 18/737,528

(22) Filed: Jun. 7, 2024

(51) Int. Cl.
*G06F 3/06* (2006.01)
*G06F 9/455* (2018.01)

(52) U.S. Cl.
CPC .......... *G06F 3/0608* (2013.01); *G06F 3/0659* (2013.01); *G06F 3/0673* (2013.01); *G06F 9/45558* (2013.01); *G06F 2009/45583* (2013.01)

(58) Field of Classification Search
CPC .... G06F 3/0608; G06F 3/0659; G06F 3/0673; G06F 9/45558; G06F 2009/45583
See application file for complete search history.

(56) References Cited

U.S. PATENT DOCUMENTS

| | | | |
|---|---|---|---|
| 7,418,584 B1 * | 8/2008 | Klaiber | G06F 9/45533 712/229 |
| 9,721,030 B2 * | 8/2017 | Parish | G06F 40/18 |
| 2008/0005748 A1 * | 1/2008 | Mathew | G06F 11/0769 719/318 |
| 2008/0162849 A1 * | 7/2008 | Savagaonkar | G06F 12/145 711/E12.091 |
| 2008/0215770 A1 * | 9/2008 | Liu | G06F 9/45558 710/30 |
| 2025/0147900 A1 * | 5/2025 | Li | G06F 21/78 |
| 2025/0148034 A1 * | 5/2025 | Shribman | H04L 67/1021 |

* cited by examiner

*Primary Examiner* — Sean D Rossiter
(74) *Attorney, Agent, or Firm* — Dority & Manning, P.A.

(57) ABSTRACT

Systems and methods are provided. An example method can include receiving, from a first process, a first request for first data to be written to a first memory location by a second process. The example method can include providing a second request for the first process to write data to a second memory location, wherein the second process has write access to the second memory location and not the first memory location. The example method can include receiving a first notification indicating that the second process has written the first data to the second memory location. The example method can include transferring the first data from the second memory location to the first memory location. The example method can include providing a second notification to the first process indicating that the first data has been written to the first memory location.

20 Claims, 4 Drawing Sheets

ISOLATION OF PROCESSES USING SHARED MEMORY FOR COMMUNICATION

BACKGROUND

Shared memory is computer memory configured to be accessed by more than one process or device. In some instances, shared memory can be used as a means of communication between processes or devices.

A virtual machine is a virtualization technology for emulating a physical computing system. A virtual machine typically runs a guest operating system in conjunction with a virtual machine monitor, such as a hypervisor, that is configured to coordinate access to physical resources of a "host" physical machine, such as a memory and a processor device, by one or more "guest" virtual machines running on the "host" physical machine.

SUMMARY

The present disclosure is generally directed to systems and methods for providing memory isolation between processes that may otherwise be designed to use shared memory for communication.

In one implementation, a method is provided. The method includes receiving, by a computing system comprising one or more computing devices, from a first process executing on the computing system, a first request for first data to be written to a first memory location of the computing system by a second process executing on the computing system, wherein the second process does not have write access to the first memory location. The method further includes providing, by the computing system to the second process, a second request for the first data to be written by the second process to a second memory location of the computing system, wherein the second process has write access to the second memory location. The method further includes receiving, by the computing system from the second process, a first notification indicating that the second process has written the first data to the second memory location. The method further includes transferring, by the computing system, the first data from the second memory location to the first memory location. The method further includes providing, by the computing system to the first process, a second notification indicating that the first data has been written to the first memory location.

In another implementation, a computing system is provided. The computing system includes one or more computing devices. The computing devices are to receive, from a first process executing on the computing system, a first request for first data to be written to a first memory location of the computing system by a second process executing on the computing system, wherein the second process does not have write access to the first memory location. The computing devices are further to provide, to the second process, a second request for the first data to be written by the second process to a second memory location of the computing system, wherein the second process has write access to the second memory location. The computing devices are further to receive, from the second process, a first notification indicating that the second process has written the first data to the second memory location. The computing devices are further to transfer the first data from the second memory location to the first memory location. The computing devices are further to provide, to the first process, a second notification indicating that the first data has been written to the first memory location.

In another implementation, a non-transitory computer-readable storage medium is provided. The non-transitory computer-readable storage medium includes executable instructions to cause a processor device to receive, from a first process executing on a computing system comprising the one or more processor devices, a first request for first data to be written to a first memory location of the computing system by a second process executing on the computing system, wherein the second process does not have write access to the first memory location. The instructions further cause the processor device to provide, to the second process, a second request for the first data to be written by the second process to a second memory location of the computing system, wherein the second process has write access to the second memory location. The instructions further cause the processor device to receive, from the second process, a first notification indicating that the second process has written the first data to the second memory location. The instructions further cause the processor device to transfer the first data from the second memory location to the first memory location. The instructions further cause the processor device to provide, to the first process, a second notification indicating that the first data has been written to the first memory location.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples and claims are not limited to any particular sequence or order of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

Shared memory is computer memory configured to be accessed by more than one process or device. Some existing processes (e.g., processes associated with legacy hardware or software, etc.) may be designed to use shared memory for communication. By default, some shared-memory processes may need or expect to have access to an entire memory space of another shared-memory process, or may otherwise share more memory space than necessary by default. For some existing processes, it may be impractical or infeasible to change this default behavior (e.g., because of unavailable source code, interoperability issues between processes, backward compatibility issues, etc.).

However, sharing more memory space than necessary can cause a variety of technical problems. For example, in some instances, sharing an entire memory space can create security vulnerabilities by potentially allowing a malicious actor to read private data from memory; write malicious data, such as malicious computer code, into memory; or other unwanted behavior. As another example, sharing an entire memory space for shared memory communication can prevent or interfere with the use of other beneficial technologies.

For example, one beneficial technology for reducing memory usage (e.g., random access memory or RAM memory usage) can include same-page merging, wherein duplicate memory "pages" (i.e., regions or blocks of memory) associated with multiple processes can be "merged" into one read-only page; the read-only page can be made accessible to each of the multiple processes; and duplicate copies can be deleted. By deleting the duplicate copies, a system can free up memory space to be used for other things. Duplicate memory pages are common, for example, on physical machines running multiple virtual machines with the same version of a guest operating system (e.g., Red Hat Enterprise Linux 7, etc.).

However, same-page merging can in some instances be incompatible with shared memory communication. For example, one method for same-page merging can include saving a merged page as one physical memory page, and marking the physical memory page as copy-on-write, so that if any process seeks to write to the merged page, the page will be un-merged by creating a new copy of the physical page and writing to the new copy. However, because this new copy will be accessible only to the process that wrote to it, a page marked as copy-on-write cannot be used for shared memory communication. Similarly, because copy-on-write pages cannot be used for shared memory communication, a process that opens up its entire memory space for shared-memory communication will not be able to mark any pages as copy-on-write, thereby preventing same-page merging in some circumstances. Thus, it is desirable to isolate all or part of a process's memory space, while still providing communication between processes designed to use shared memory for communication.

The examples set forth below can provide various means for providing communication and memory isolation between processes that use shared memory for communication. For example, a first and second process can have access to first and second memory spaces, which may be partially or completely isolated from each other. A third process (e.g., virtual machine monitor, etc.) or system can act as a messenger between the first and second process. The messenger can establish a first communication channel with the first process, and a second communication channel with the second process. When the first process attempts to send a shared memory communication to the second process (e.g., by writing to memory accessible only to the first process and the messenger), the messenger can intercept the message and pass a modified or unmodified message to the second process. Additional technical details, describing various ways that shared-memory messages can be intercepted and passed between processes, are further described in the examples set forth below.

In some instances, the messenger can include a trusted process or supervisory process (e.g., virtual machine monitor, etc.) that may have access to an entire memory space of a physical machine; an entire memory space of the first or second process; or the like. For example, in some instances, the messenger can include a virtual machine monitor operating or overseeing a plurality of virtual machines; a first process can include a virtual machine, or a device driver executing on a virtual machine; and the second process can include an emulated device to communicate via shared memory with the virtual machine or device driver. In some instances, a virtual machine monitor can perform various memory management functions, such as allocating memory (e.g., virtual memory, physical memory, etc.) and controlling memory access for the first process and second process; employing memory-saving methods such as same-page merging; and other memory management functions.

The examples set forth below provide a variety of technical effects and benefits, such as improved security and reduced memory usage compared to alternate methods for shared memory communication. For example, some shared memory communication methods may allow direct in-memory communication between untrusted processes, which may create security vulnerabilities. For example, uncontrolled access to shared memory may allow the unauthorized or unintended reading of private data; malicious writing of data (e.g., malicious computer code) to shared memory; or other security vulnerabilities. Advantageously, the examples set forth below can partially or completely isolate a memory area accessible to a first process from a memory area accessible to a second process. In this manner, for instance, a security risk associated with shared memory can be reduced.

As another example, the examples set forth below can save memory space compared to some alternate methods of shared memory communication by enabling same-page merging in processes that use shared memory communication. For example, some alternate methods of shared memory communication may operate by sharing an entire memory space between a first and second process. For example, an emulated device and device driver of a virtual machine may be designed, by default, to operate under the assumption that the emulated device has access to an entire memory space associated with the virtual machine. However, as explained above, sharing an entire memory space can completely prevent same-page merging in some instances, as a process that opens up its entire memory space for shared-memory communication will not be able to mark any pages as copy-on-write. In contrast, the examples set forth below can greatly reduce an amount of memory accessible to a second process (e.g., emulated device) and can completely or partially isolate first-process memory from second-process memory. In this manner, for instance, the examples set forth below can enable same-page merging for processes that use shared memory communication, thereby reducing a memory footprint associated with the processes and improving the functioning of the computing system itself.

Additionally, a reduced memory footprint can lead to other technical effects and benefits, such as a reduced computational cost (e.g., electricity cost, processor usage, etc.) of executing one or more computing processes; a reduced hardware cost (e.g., number of server computing devices needed, etc.) of executing one or more computing processes; and the like. For example, in some instances, a reduced memory footprint can enable a single physical device (e.g., server computing device) to execute more processes than it otherwise could. For example, reducing memory pressure with same-page merging can allow a single physical device to host a greater number of virtual machines than it otherwise might. In this manner, for instance, the number of physical computing devices needed to operate a given number of virtual machines can be reduced, thereby reducing a hardware cost of operating a given number of virtual machines. Additionally, because each physical computing device requires various computational resources (e.g., electricity, processor time, etc.) to operate, using fewer physical computing devices to run the same number of virtual machines can reduce a computational cost (e.g., electricity cost, etc.) of operating a given number of virtual machines.

Figure 1:
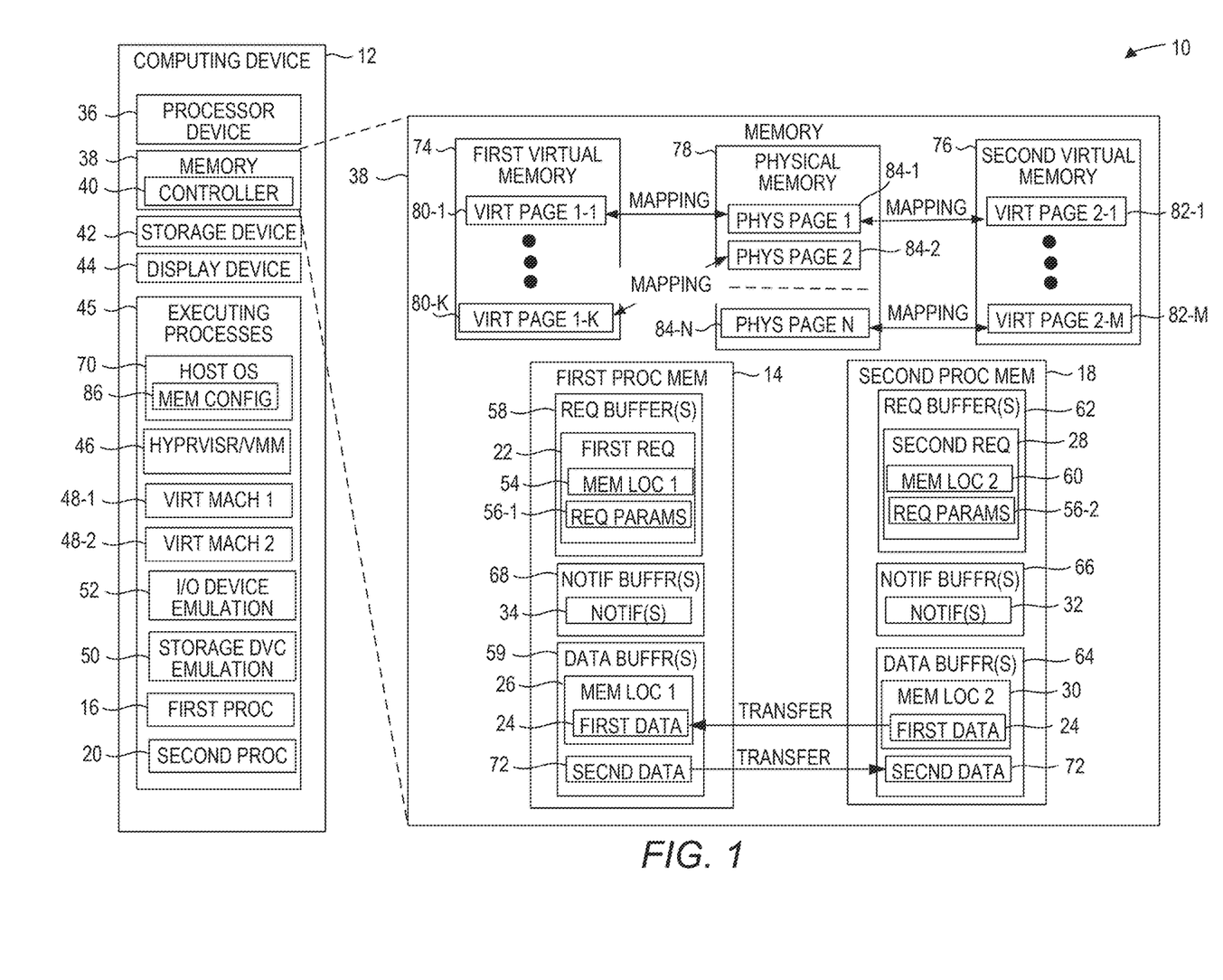
FIG. 1 is a block diagram of an environment in which examples disclosed herein may be practiced.

FIG. 1 is a block diagram of an environment in which examples disclosed herein may be practiced. A computing system 10 can comprise one or more computing devices 12. A computing device 12 can allocate a first-process memory area 14 to a first process 16, and can allocate a second-process memory area 18 to a second process 20. The computing device 12 can receive, from the first process 16, a first request 22 for the second process 20 to write first data 24 to a first memory location 26. The computing device 12 can provide, to the second process 20, a second request 28 for the second process 20 to write the first data 24 to a second memory location 30. The computing device 12 can receive, from the second process 20, a first notification 32 indicating that the second process 20 has written the first data 24 to the second memory location 30. The computing device 12 can transfer the first data 24 from the second memory location 30 to the first memory location 26. The computing device 12 can provide a second notification 34 to the first process 16 indicating that the first data 24 has been written to the first memory location 26.

A computing device 12 may comprise any computing or electronic device capable of including firmware, hardware, and/or executing software instructions to implement the functionality described herein, such as a computer server, a desktop computing device, a laptop computing device, a smartphone, a computing tablet, or the like. Each computing device 12 of a computing system 10 can include one or more processor devices 36, memories 38 comprising a memory controller 40, storage devices 42, or display devices 44. The computing device 12 can execute one or more executing process 45 (e.g., using the one or more processor devices 36, etc.). In some implementations, a computing device 12 can include a client device or a server device. Additional example implementation details for a computing device 12 are provided below with respect to FIG. 4.

A first-process memory area 14 can include, for example, a region of memory (e.g., random access memory (RAM)) that is accessible (e.g., read-accessible, write-accessible, etc.) to a first process 16. The first-process memory area 14 can include, for example, virtual memory (e.g., allocated or managed by a virtual machine monitor 46), physical memory (e.g., memory 38 associated with a computing device 12), or both. The first-process memory 14 can be stored on one device (e.g., memory device 38, computing device 12, etc.) or distributed across multiple devices, and can be stored in a continuous memory region or a plurality of discontinuous memory regions.

A first process 16 can include, for example, any process (e.g., software process, firmware process) executing on a computing device 12. A first process 16 can include, for example, a process to communicate (e.g., with the second process 20) using shared memory. In some instances, a first process 16 can include a virtual machine 48 being operated or managed by a virtual machine monitor 46. In some instances, the first process 16 can include a device driver associated with (e.g., executing on) a virtual machine 48. For example, in some instances, a first process 16 can include a device driver to facilitate interaction between a guest operating system of the virtual machine 48 and a virtual or physical device, such as an emulated device associated with a device emulation process (e.g., storage device emulation process 50, input/output device emulation process 52, etc.). In some instances, a first process 16 can include a guest operating system or component thereof (e.g., device driver, kernel, etc.).

A second-process memory area 18 can include, for example, a region of memory (e.g., random access memory (RAM)) that is accessible (e.g., read-accessible, write-accessible, etc.) to a second process 20. The second-process memory area 18 can include, for example, virtual memory (e.g., allocated or managed by a virtual machine monitor 46), physical memory (e.g., memory 38 associated with a computing device 12), or both. The second-process memory area 18 can be stored on one device (e.g., memory device 38, computing device 12, etc.) or distributed across multiple devices, and can be stored in a continuous memory region or a plurality of discontinuous memory regions. The second-process memory area 18 can be completely or partially isolated from the first-process memory area 14. As used herein, complete isolation can mean that the first-process memory 14 and second-process memory 18 do not overlap at all (i.e., do not share any memory locations in common) at a given time. Partial isolation can mean that the first-process memory 14 and second-process memory 18 have shared access to at least one memory location, and at least one of the first-process memory 14 and second-process memory 18 has unshared access to at least one memory location.

A second process 20 can include, for example, any process (e.g., software process, firmware process) executing on a computing device 12. A second process 20 can include, for example, a process to communicate (e.g., with the first process 16, with a virtual machine 48 or associated device driver, etc.) using shared memory. In some instances, a second process 20 can include a device emulation process, such as a storage device emulation process 50 or an input/output device emulation process 52.

A first request 22 can include, for example, any data indicative of a request for the second process 20 to write first data 24 to a first memory location 26. In some instances, a first request 22 can include first location data 54 indicative of the first memory location 26. In some instances, a first request 22 can include one or more other request parameters 56. Request parameters 56 can include, for example, data indicative of an action to be performed on the memory location (e.g., read, write, etc.). For example, in some instances, a request parameter 56 can include data (e.g., read/write flag, operation code, subroutine or method call associated with a computer programming language or application programming interface, etc.) indicative of an action (e.g., send data, receive data, process received data, store received data, etc.) the second process 20 is requested to take. In some instances, the first request 22 can be generated by or sent by the first process 16 or a component thereof. For example, in some instances, the first request 22 can be generated or sent by a device driver executing on a virtual machine 48 associated with the first process 16.

In some instances, a request parameter 56 can include identification data indicative of the first data 24. Identification data can include, for example, any data used to describe, define, or otherwise characterize the first data 24 to be written to the first memory location 26. For example, in some instances, identification indicative of the first data 24 can include additional location data (e.g., location data separate from the first location data 54), such as data indicative of a location associated with the first data 24. As a non-limiting illustrative example, a first request 22 can include a request to an emulated file system, and a request parameter 56 can include file location data (e.g., filename, pathname, etc.) for a file associated with the first data 24. As another example, a first request 22 can include a request to an emulated input/output device, and a request parameter 56 can include relative location data indicative of a location of the first data 24 (e.g., memory offset value, buffer offset value, etc.) with respect to a location space (e.g., memory space, storage space, buffer space, etc.) of the emulated input/output device. Other examples of identification data indicative of the first data 24 can include computer-readable instructions (e.g., operation code, etc.) defining the first data 24 to be communicated; name or identification number associated with the first data 24 (e.g., variable name, row identification number of a database row, etc.); or other identification data.

In some instances, the computing device 12 or an executing process 45 executing on the computing device 12 (e.g., virtual machine monitor 46, etc.) can receive the first request 22. Receiving a request can include, for example, any method for receiving a request, such as via shared memory communication; via one or more network signals (e.g., hypertext transfer protocol request, etc.); via one or more local signals within the computing device 12 (e.g., via bus, signal line, PCIe connection, etc.); or other method.

In some instances, receiving a first request 22 can include monitoring one or more first request buffers 58. A first request buffer 58 can include, for example, any memory area (e.g., ring buffer area or other buffer area, work queue area, job queue area, designated memory region, etc.) for sending and receiving requests (e.g., data read/write requests, etc.). For example, a first process 16 can send a first request 22 by writing the first request 22 to a first request buffer 58 (e.g., work queue, ring buffer, etc.). The computing device 12 or executing process 45 (e.g., virtual machine monitor 46) can receive the first request 22 by monitoring the first request buffer 58 and, responsive to the first process 16 writing the first request 22 to the first request buffer 58, reading the first request 22 from the first request buffer 58. Monitoring a first request buffer 58 can include, for example, periodically or repeatedly checking the buffer; initializing a trigger, event listener, interrupt handler or other computer-readable instructions to be executed responsive to a change to the first request buffer 58; or other monitoring method. In some instances, the first request buffer 58 can be located in the first-process memory area 14. In some instances, the first request buffer 58 can include a memory area that is accessible to both the first process 16 and one or more other executing processes 45 (e.g., an executing process 45 that receives the first request 22; sends the second request 28; receives the first notification 32; transfers the first data 24; sends the second notification 34; and so on).

First data 24 can include, for example, any data to be written to a memory location 26, 30. As a non-limiting illustrative example, first data 24 can include data indicative of stored data (e.g., data stored in a file, folder, database, data table, hard disk, optical disk, virtual storage device, etc.), data indicative of one or more signals or messages (e.g., network messages such as requests, responses, etc.; signals to or from a physical or virtual input/output device; etc.), data indicative of one or more computer-readable instructions (e.g., computer code such as source code, machine code, byte code, assembly code, application programming interface code, etc.), or any other data.

A first memory location 26 can include, for example, a memory location in the first-process memory area 14. For example, the first memory location 26 can include a memory location that is read-accessible or write-accessible to the first process 16. In some instances, the first memory location 26 may be isolated from the second-process memory area 18. For example, although the first request 22 may contain a request for the second process 20 to write first data 24 to the first memory location 26, the first memory location 26 can include a memory location that the second process 20 does not have write access to.

In some instances, a first memory location 26 can be located in a first data buffer 59. A first data buffer 59 can include, for example, a memory area (e.g., ring buffer area or other buffer area, designated memory region, work queue area, etc.) for reading and writing data (e.g., for shared memory communication). In some instances, the first data buffer 59 can be located in the first-process memory area 14. In some instances, the first data buffer 59 can include a memory area that is accessible to both the first process 16 and one or more other executing processes 45 (e.g., an executing process 45 that receives the first request 22; sends the second request 28; receives the first notification 32; transfers the first data 24; sends the second notification 34; and so on).

A second request 28 can include, for example, any data indicative of a request for the second process 18 to write the first data 24 to a second memory location 30. In some instances, a second request can include second location data 60 and one or more request parameters 56-2. In some instances, the second location data 60 can be different from the first location data 54. In some instances, the second location data 60 can include location data indicative of a second memory location 30 different from the first memory location 26. In some instances, the request parameters 56-2 can be the same as or different from the request parameters 56-1 associated with the first request 22. For example, in some instances, a computing device 12 can replace the first location data 54 with the second location data 60, and otherwise leave the request parameters 56-1, 56-2 unmodified (e.g., by copying or otherwise adding the request parameters 56-1 to the second request 28). For example, in some instances, the second request 28 can consist of identical data in an identical format compared to the first request 22, except that the first location data 54 can be replaced by second location data 60. In this manner, for instance, a first request 22 can be provided in a format that appears, from the point of view of a second process 20, to have come directly from the first process 16. Additionally, by retaining an identical message format and content, the computing device 12 can ensure that the first process 16 and second process 20 communicate as intended, without having to modify the functioning of the processes 16, 20 and without providing the processes 16, 20 with access to each other's memory areas 14, 18.

In other instances, a computing device 12 may modify the request parameters 56-2 to be different from the request parameters 56-1. As a non-limiting example, if the request parameters 56-2 contain additional data indicative of a memory location (e.g., relative memory offset) or the like, a computing device 12 may modify the additional data based on a comparison between the second-process memory area 18 and another memory area (e.g., first-process memory area 14, etc.). For example, if a first process 16 generates a first request 22 based on an assumption that the second process 20 has access to an entire first-process memory area 14, the first request 22 may include location data that is inappropriate for use with a second process 20 that has access to the second-process memory area 18 and not the first-process memory area 14. In such instances, a computing device 12 can modify a request parameter 56-2 comprising location data (e.g., memory offset data, etc.) such as by adjusting the location data based on a comparison between the first-process memory area 14 and second-process memory area 18.

In some instances, providing a second request 28 to the second process 20 can include writing the second request 28 to a second request buffer 62. A second request buffer 62 can have, for example, any property described above with respect to the first request buffer 58, except that the second request buffer 62 can be located in the second-process memory 18 to be accessed by the second process 20 and, optionally, another executing process 45 for performing one or more actions described herein with respect to FIG. 1. For example, a computing device 12 or executing process 45 thereof (e.g., virtual machine monitor 46, etc.) can write a second request 28 to the second request buffer 62 (e.g., job queue, ring buffer, etc.). The second process 20 can receive the second request 28 by monitoring the second request buffer 62 and, responsive to the computing device 12 writing the second request 28 to the second request buffer 62, reading the second request 28 from the second request buffer 62.

A second memory location 30 can include, for example, any memory location in the second-process memory area 18. In some instances, the second memory location 30 can include a memory location that is read-accessible or write-accessible to the second process 20. In some instances, the second memory location 30 may be isolated from the first-process memory area 14. For example, although the first request 22 may contain a request for the second process 20 to write first data 24 in a location accessible to the first process 16 for reading by the first process 16, the second memory location 30 can include a memory location that the first process 16 does not have read access to.

In some instances, a second memory location 30 can be located in a second data buffer 64. A second data buffer 64 can include, for example, a memory area (e.g., ring buffer area or other buffer area, designated memory region, work queue area, etc.) for reading and writing data (e.g., for shared memory communication). In some instances, the second data buffer 64 can be located in the first-process memory area 14. In some instances, the second data buffer 64 can include a memory area that is accessible to both the second process 20 and one or more other executing processes 45 (e.g., a virtual machine monitor 46 that receives the first request 22; sends the second request 28; receives the first notification 32; transfers the first data 24; sends the second notification 34; and so on).

Although FIG. 1 depicts one first data buffer 59 and one second data buffer 64, in some instances, additional data buffers are possible. For example, in some instances, a computing device 12 can comprise two or more first data buffers 59 and two or more second data buffers 64, such as separate "data in" buffers 59, 64 and "data out" buffers 59, 64. For example, an "out" buffer 59, 64 can include data read from a second process 20 and provided to a first process 16, while an "in" buffer can include a buffer for communicating data written to a second process 20 (e.g., device emulation process 50, 52, etc.) based on data from the first process 16.

A first notification 32 can include, for example, any data indicating that the second process 20 has fulfilled a first request 22. For example, in some instances, a first notification 32 can include a basic data item (e.g., Boolean flag, single-byte data item, completion code, success code, confirmation code, etc.) indicative of successful completion of a task. In some instances, a first notification 32 can include additional data, such as a return value; a description of the task successfully completed or other data associated with the first request 22 (including, e.g., the first request 22 itself or a component thereof); or the like.

A first notification 32 can be received in any appropriate way, such as via shared memory communication (e.g., in the second-process memory 18, etc.); via data signal (e.g., network signal, local signal within the computing device 12, etc.); or other appropriate method. In some instances, receiving a first notification 32 can include monitoring a first notification buffer 66; and receiving the first notification 32 from the first notification buffer 66. Monitoring a buffer 58, 59, 62, 64, 66 can include, for example, periodically or repeatedly checking (e.g., reading, accessing, etc.) the buffer; initializing a trigger, event listener, interrupt handler or other computer-readable instructions to be executed responsive to a change to the buffer; or other monitoring method. Receiving from a buffer 58, 59, 62, 64, 66 can include, for example, reading from the buffer (e.g., responsive to another executing process 45 writing to the buffer). In some instances, a first notification buffer 66 can have any property described above with respect to a second request buffer 62 or second data buffer 64. In some instances, the buffers 62, 64, 66 can include three separate and independent buffers. However, this is not required. For example, a number greater or less than three can be used without deviating from the scope of the present disclosure.

Responsive to receiving the first notification 32, the computing device 12 can transfer the first data 24 from the second memory location 30 to the first memory location 26. Transferring can include, for example, copying; cutting and pasting; or other transfer method. Upon transferring the first data 24 to the first memory location 26, the computing device 12 can provide a second notification 34 to the first process 16 indicating that the first data 24 has been written to the first memory location 26.

A second notification 34 can be, comprise, be comprised by, or otherwise share one or more properties with a first notification 32. For example, in some instances, a second notification 34 can have any property described above with respect to a first notification 32. In some instances, a second notification 34 can be identical (e.g., in content, format, etc.) to a first notification 32. For example, in some instances, providing a second notification 34 to the first process 16 can include forwarding the first notification 32 to the first process 16 without modification. For example, providing a second notification 34 to the first process 16 can include transferring (e.g., copying, etc.) the first notification 32 from the first notification buffer 66 to a second notification buffer 68 located in the first-process memory area 14. A second notification buffer 68 can have, for example, any property described above with respect to the first notification buffer 66, except that the second notification buffer 68 can be located in first-process memory 14. In some instances, providing a second notification 34 to the first process 16 can include modifying the first notification 32 before providing the modified notification to the first process 16. For example, in some instances, a first notification 32 may include location data, such as memory location data specific to the second-process memory area 18 (e.g., second location data 60, etc.). In such instances, a computing device 12 can replace the location data with modified location data, such as memory location data specific to the first-process memory area 14 (e.g., first location data 54, etc.).

A processor 36, memory 38, memory controller 40, storage device 42, and display device 44 can include any device or component (e.g., computing component) to perform the functions of a processor, memory, memory controller, storage device, or display device. Further details of example components of an example computing system are further provided below with respect to FIG. 4.

An executing process 45 can include, for example, any process (e.g., software process, firmware process, operating system process, thread, job, subprocess, etc.) executing on the computing device 12.

In some instances, the activities described in FIG. 1 as being performed by a computing device 12 can be performed by one or more executing processes 45 of the computing device 12. For example, in some instances, a virtual machine monitor 46 executing on the computing device 12 can receive, from a first process executing on the computing system, a first request for first data to be written to a first memory location of the computing system by a second process executing on the computing system, wherein the second process does not have write access to the first memory location. In some instances, a virtual machine monitor 46 executing on the computing device 12 can provide, to the second process, a second request for the first data to be written by the second process to a second memory location of the computing system, wherein the second process has write access to the second memory location. In some instances, a virtual machine monitor 46 executing on the computing device 12 can receive, from the second process, a first notification indicating that the second process has written the first data to the second memory location. In some instances, a virtual machine monitor 46 executing on the computing device 12 can transfer the first data from the second memory location to the first memory location. In some instances, a virtual machine monitor 46 executing on the computing device 12 can provide, to the first process, a second notification indicating that the first data has been written to the first memory location.

A virtual machine monitor 46 (e.g., hypervisor, virtualizer, etc.) can include any executing process 45 to implement a virtualized environment via virtual machine (VM) virtualization technology on the computing device 12. The VM virtualization technology may comprise, by way of non-limiting example, Red Hat Enterprise Linux virtualization technology, VMware® virtualization technology, Microsoft® Hyper-V virtualization technology, Oracle VM Server for SPARC virtualization technology, or the like. The virtual machine monitor 46 can include, for example, any executing process 45 for initializing, running, monitoring, configuring, overseeing, or otherwise managing one or more virtual machines 48. As used herein, the terms "virtual machine monitor" and "hypervisor" can be considered interchangeable, and any action described as being performed by a virtual machine monitor 46 can be performed by a hypervisor and vice versa. A hypervisor can include, for example, a "bare metal" hypervisor running directly on native hardware; a "hosted" or "type 2" hypervisor (e.g., Quick Emulator (QEMU)) running on a host operating system (e.g., Red Hat Enterprise Linux, etc.); a kernel-based hypervisor module to cause a host operating system 70 to function as a hypervisor (e.g., Kernel-based Virtual Machine (KVM) hypervisor); and the like.

In some instances, an executing process 45 for performing the activities described in FIG. 1 can be the same as or different from the first process 16 or second process 20. For example, in some instances, a virtual machine monitor 46 operating a plurality of virtual machines 48 may be viewed or described (e.g., by a host operating system 70) as the same process or a different process from the virtual machines 48 it is operating; as the same process or a different process from one or more device emulation processes 50, 52 interacting with the virtual machines 48 it is operating; etc. As another example, in some instances, a device driver executing on a virtual machine 48 may be viewed or described (e.g., by a host operating system 70) as the same process or a different process from the virtual machine 48 on which it is executing. However, as used herein, the first process 16 and second process 20 can include processes that may be viewed or described (e.g., by a host operating system 70) as subprocesses of the same process (e.g., virtual machine monitor 46, etc.) without deviating from the scope of the present disclosure, if the process treats the subprocesses as separate entities having restricted access to separate memory areas that are completely or partially isolated from each other. For example, in some instances, a virtual machine monitor 46 can perform the activities described in FIG. 1 and a first process 16 can include a virtual machine 48 executing in the virtual machine monitor 46, regardless of whether a host operating system 70 may view the virtual machine 48 and the virtual machine monitor 46 as the same process or different processes.

A virtual machine 48 can include, for example, an executing process to emulate a computing system or device. A virtual machine 48 can, for example, run one or more processes (e.g., guest operating system processes, software application processes, etc.) using virtual hardware (e.g., virtual memory, virtual processor device, etc.) mapped to physical hardware of the computing device 12 by a virtual machine monitor 46.

A storage device emulation process 50 can include, for example, a process for emulating the behavior of a storage device, such as a file system, block device (e.g., hard disk, solid state drive, etc.), or other storage device. The storage device emulation process 50 can receive data storage requests (e.g., data read requests, data write requests, etc.) and can read and write data in response to the storage requests (e.g., in physical storage space of the computing device 12). In some instances, a storage device emulation process 50 can include a file system emulation process (e.g., virtioFS, etc.) to emulate a file system accessible to one or more virtual machines 48. In some instances, an emulated file system can include a shared file system to be shared between a plurality of virtual machines. For example, in some instances, a storage device emulation process 50 can include a process (e.g., virtioFS, etc.) to provide a plurality of virtual machines 48 with access to a shared directory tree stored in physical storage space of a host computing device 12.

An input-output device emulation process 52 can include, for example, any process for emulating the behavior of an input/output device, such as a serial input/output device, a network input/output device, or the like. For example, in some instances, an input-output device emulation process 52 can include a network emulator to provide communication between a plurality of virtual machines 48 (e.g., running on the same or different computing devices 12, etc.) via a virtual network.

In some instances, a first process 16 can include a virtual machine 48 or a device driver executing on the virtual machine 48. In some instances, a second process 20 can include a device emulation process 50, 52. For example, a virtual machine monitor 46 can receive, from a device driver of a virtual machine 48, a first request 22 for a storage device emulation process 50 to write file data from a virtual file system to a data buffer 59, 64. Based on the first request 22, a virtual machine monitor 46 can provide a second request 28 to the storage device emulation process 50. The storage device emulation process 50 can fulfill the request by writing the file data to the second memory location 30 in the second data buffer 64 and send a first notification 32. The virtual machine monitor 46 can then transfer the file data from the second memory location 30 to the first memory location 26 and provide a second notification 34 to the device driver of the virtual machine 48.

Instead of or in addition to facilitating fulfillment of a first request 22 as described above, a computing device 12 can in some instances perform one or more additional actions. Additional actions can include, for example, facilitating additional communications between the first process 16 and second process 20; performing one or more memory management functions; or any other appropriate action.

For example, in some instances, a first process 16 can attempt to send second data 72 to a second process 20 (e.g., without receiving a request from the second process 20 for the second data 72). For example, the first process 16 may write the second data 72 to a memory location (e.g., in a first data buffer 59) and provide a third notification (e.g., directed to the second process 20) indicating that the second data 72 has been written. A third notification may include, for example, location data indicating where the second data 72 was written by the first process 16; notification parameters (e.g., similar to or different from request parameters 56, etc.); or other data. In such instances, a computing device 12 or executing process 45 thereof (e.g., virtual machine monitor 46) can receive the third notification; transfer the data to the second-process memory area 18 (e.g., to the second data buffer 64); and provide a fourth notification to the second process 20. A fourth notification can include, for example, location data indicating where the second data 72 was transferred to by the computing device 12; notification parameters; or other data. For example, a fourth notification may consist of identical data in an identical format compared to a third notification, except that the location data indicating where the second data 72 was written by the first process 16 can be replaced by location data indicating where the second data 72 was transferred to by the computing device 12. In this manner, for instance, a fourth notification can be provided in a format that appears, from the point of view of a second process 20, to have come directly from the first process 16. Additionally, by retaining an identical message format and content, the computing device 12 can ensure that the first process 16 and second process 20 communicate as intended, without having to modify the functioning of the processes 16, 20 and without providing the processes 16, 20 with access to each other's memory areas 14, 18. In some instances, the actions described in this paragraph (e.g., receiving and providing notifications, transferring data, etc.) can be performed in any manner described above with respect to similar actions. For example, receiving a notification can include monitoring a notification buffer 68, 66; providing a notification can include writing to a notification buffer 66, 68; transferring can include copying; etc. As another example, notification parameters can have any property described above with respect to request parameters 56; second data 72 can have any property described above with respect to first data 24; and so on.

In some instances, a computing device 12 or executing process 45 thereof (e.g., virtual machine monitor 46, etc.) can perform one or more memory management functions, such as allocating physical memory or virtual memory; mapping physical memory to virtual memory and vice versa; or deduplicating memory data to reduce memory usage or to free up memory for other uses.

For example, in some instances, a computing device 12 or executing process 45 thereof (e.g., virtual machine monitor 46, etc.) can allocate the first-process memory area 14 to the first process 16. In some instances, a computing device 12 or executing process 45 thereof (e.g., virtual machine monitor 46, etc.) can allocate the second-process memory area 18 to the second process 20. For example, in some instances, a substantial amount of memory space (e.g., gigabytes, hundreds of megabytes, etc.) can be allocated to each of one or more virtual machines 48 running on a computing device 12. In some instances, a virtual machine monitor 46 can allocate a much smaller (e.g., a few megabytes, such as 2, 5, 10, or 20 megabytes, etc.) memory area to act as a shared memory area for shared memory communication between a second process 20 (e.g., device emulation process 50, 52) and a virtual machine monitor 46.

In some instances, a computing device 12 can adjust an allocation of memory based on an amount of memory usage; an amount of memory space available; and the like. For example, in some instances, a computing system can determine that a memory area 14, 18 has insufficient space (e.g., based on a first request 22, based on a first, second, third, or fourth notification 32, 34, etc.), and can allocate additional memory (e.g., a few additional megabytes; an amount of memory required to fulfill a first request 22, write second data 72 to a second-process memory area 18, etc.) responsive to the determining.

In some instances, a computing device 12 can perform data deduplication (e.g., same-page merging such as kernel same-page merging, etc.) in memory 38 of the computing device 12 to reduce memory usage, increase available memory space, or otherwise use the memory 38 more efficiently.

For example, in some instances, an allocation of memory 38 can include one or more virtual memory areas 74, 76 that are mapped to a physical memory area 78 associated with a physical memory device of the computing device 12. A physical memory area 78 can include, for example, volatile memory (e.g., RAM, etc.); non-volatile storage space (e.g., hard disk space, solid state drive space, etc.); or other physical device for storing data to be mapped to a virtual memory area 74, 76. For example, a computing device 12 or virtual machine monitor 46 may allocate a first virtual memory area 74 to a first virtual machine 48-1, and a second virtual memory area 76 to a second virtual machine 48-2. In some instances, each virtual memory area 74, 76 may be divided into portions (e.g., virtual pages 80-1 to 80-K, 82-1 to 82-M; memory blocks; memory regions; or the like). In some instances, each virtual memory portion 80-1 to 80-K of the first virtual memory area 74 can be mapped to a portion 84-1 to 84-N of the physical memory area 78. Mapping can include, for example, providing a data structure (e.g., page table, translation lookaside buffer, memory, register, etc.) correlating a plurality of virtual memory portions 80, 82 to a plurality of physical memory portions 84; and storing, in the data structure, one or more data items comprising first data indicative of a virtual memory portion 80, 82 and second data indicative of a physical memory portion 84 to which the virtual memory portion 80, 82 is mapped. Retrieving data from a mapped virtual memory portion 80, 82 can include receiving, by a computing system 10 from an executing process 45, a request to access the virtual memory portion 80, 82; retrieving, by the computing system 10 from the data structure correlating a plurality of virtual memory portions 80, 82 to a plurality of physical memory portions 84, a data item associated with the virtual memory portion 80, 82; and retrieving, by the computing system 10 based on the data item, the requested data from a physical memory portion 84 identified by the data item.

In some instances, a computing device 12 or executing process 45 thereof (e.g., virtual machine monitor 46) can monitor the virtual memory areas 74, 76 identify one or more virtual portions 80-1 of the first virtual memory area 74 that are identical (i.e., comprising data that is identical) to one or more virtual portions 82-1 of the second virtual memory area 76. In such instances, the computing device 12 can map the identical virtual portions 80-1, 82-1 to the same portion 84-1 of the physical memory space 78. In contrast, when virtual memory portions 80-K, 82-M contain non-identical data, they can be mapped to different portions 84-2, 84-N of the physical memory area. In some instances, after mapping two virtual memory portions 80-1, 82-1 to the same physical memory portion 84-1, a computing device can remove (e.g., delete, deallocate, reallocate, etc.) duplicate data associated with one of the identical virtual memory portions. For example, after mapping a virtual memory portion 82-1 to a physical memory portion 84-1, the computing device 12 can deallocate or reallocate another physical memory portion 84 that was formerly mapped to the virtual memory portion 82-1; map the physical memory portion 84 to a new virtual memory portion 80, 82; delete duplicate data from the physical memory portion 84 that was formerly mapped to the virtual memory portion 82-1; or otherwise remove duplicate data from the physical memory area 78. In this manner, for instance, a computing device 12 can reduce memory usage, free up memory space for other uses, and generally improve the functioning of the computing system 10.

In some instances, after mapping two or more identical virtual memory portions 80-1, 82-1 to a single physical memory portion 84-1, the computing device 12 can take one or more actions to ensure the data integrity of both virtual memory portions 80-1, 82-1. For example, the computing device 12 can update a configuration setting associated with the physical memory portion 84-1 to ensure the data integrity of both virtual memory portions 80-1, 82-1 in the event that a process (e.g., virtual machine 48-1, 48-2, etc.) writes data to or otherwise updates one of the virtual memory portions 80-1, 82-1. For example, in some instances, the computing device can update a memory configuration 86 (e.g., associated with a host operating system 70 or virtual machine monitor 46) to include a copy-on-write status for the physical memory portion 84-1. Responsive to a process (e.g., virtual machine 48-1, 48-2, etc.) attempting to write data to a virtual memory portion 80-1, 82-1 mapped to a physical memory portion 84-1 with a copy-on-write status, the computing device 12 can generate a copy of the physical memory portion 84-1 by copying data from the physical memory portion 84-1 into another physical memory portion 84. The computing device 12 can map one of the identical virtual memory portions 80-1, 80-2 (e.g., the virtual memory portion 80-1, 80-2 being written to, etc.) to the other physical memory portion 84. The computing device 12 can then update one of the physical memory portions 84 (e.g., the copied physical memory portion 84) to facilitate the process's attempt to write data to the virtual memory portion 80-1, 82-1.

Because the executing processes 45 and first and second processes 16, 20 are components of the computing device 12, functionality implemented by an executing process 45 or first or second process 16, 20 may be attributed to the computing device 12 generally. Moreover, in examples where an executing process 45 or first or second process 16, 20 comprises software instructions that program the processor device 36 to carry out functionality discussed herein, functionality implemented by an executing process 45 or first or second process 16, 20 may be attributed herein to the processor device 36.

It is further noted that while the virtual machine monitor 46, virtual machine 48, device emulation processes 50, 52, and first and second processes 16, 20 are shown as separate components, in other implementations, two or more of the virtual machine monitor 46, virtual machine 48, device emulation processes 50, 52, and first and second processes 16, 20 could be implemented in a single component or could be implemented in a greater number of components than depicted.

Figure 2:
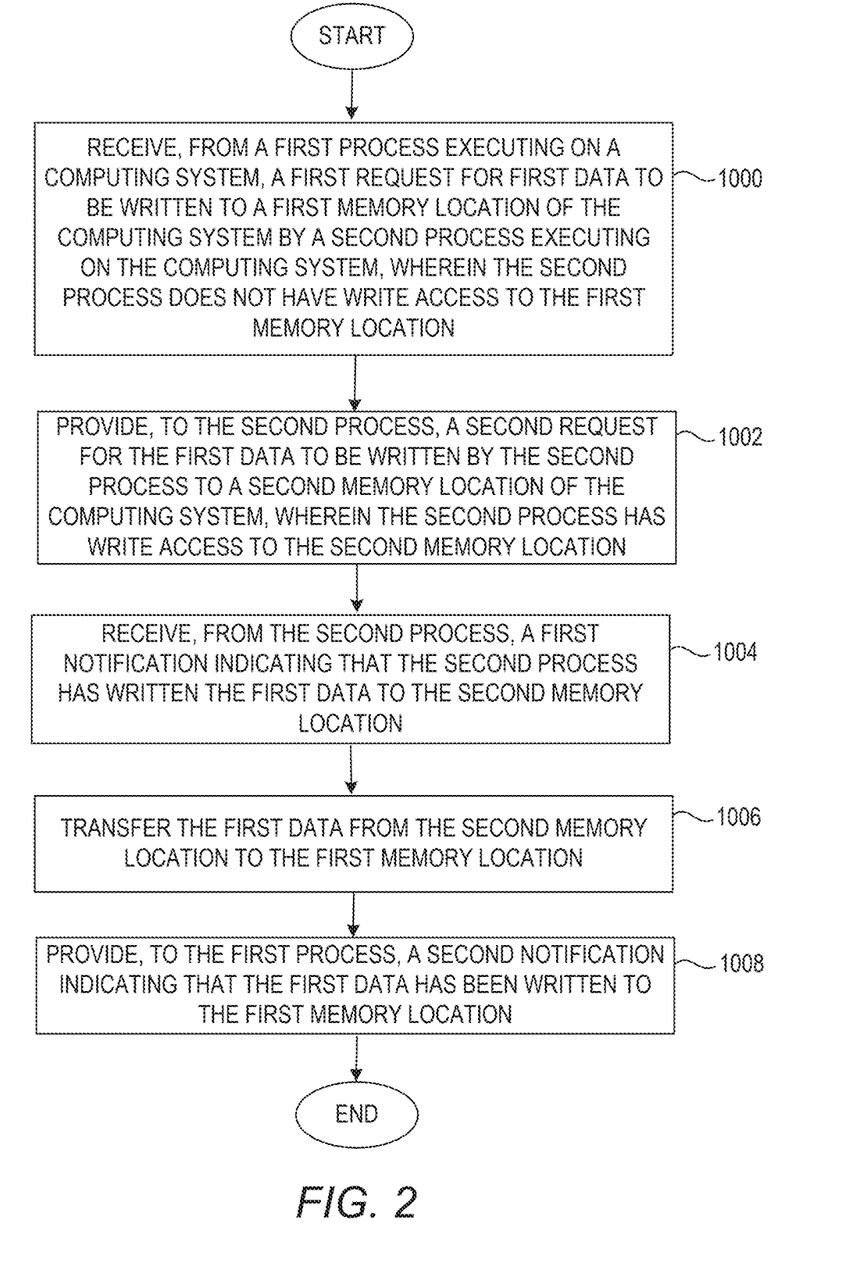
FIG. 2 is a flowchart diagram of a method for providing communication and memory isolation between processes.

FIG. 2 is a flowchart diagram of a method for providing communication and memory isolation between processes. The method of FIG. 2 can be performed, for example, by a computing system 10.

At 1000, a computing system 10 can receive, from a first process (e.g., first process 16) executing on the computing system 10, a first request (e.g., first request 22) for first data (e.g., first data 24) to be written to a first memory location (e.g., first memory location 26) of the computing system 10 by a second process (e.g., second process 20) executing on the computing system 10, wherein the second process does not have write access to the first memory location. Receiving a first request can include, for example, one or more activities described above with respect to FIG. 1 (e.g., monitoring a first request buffer 58 in a first-process memory area 14, etc.).

At 1002, the computing system 10 can provide, to the second process, a second request (e.g., second request 28) for the first data to be written by the second process to a second memory location (e.g., second memory location 30) of the computing system 10, wherein the second process has write access to the second memory location. Providing a second request can include, for example, one or more activities described above with respect to FIG. 1 (e.g., writing to a second request buffer 62 in a second-process memory area 18, etc.).

At 1004, the computing system 10 can receive, from the second process, a first notification (e.g., first notification 32) indicating that the second process has written the first data to the second memory location. Receiving a first notification can include, for example, one or more activities described above with respect to FIG. 1 (e.g., monitoring a notification buffer 66 in a second-process memory area 18, etc.).

At 1006, the computing system 10 can transfer the first data from the second memory location to the first memory location.

At 1008, the computing system 10 can provide, to the first process, a second notification (e.g., second notification 34) indicating that the first data has been written to the first memory location. Providing a second notification can include, for example, one or more activities described above with respect to FIG. 1 (e.g., writing to a notification buffer 68 in a first-process memory area 14, etc.).

Figure 3:
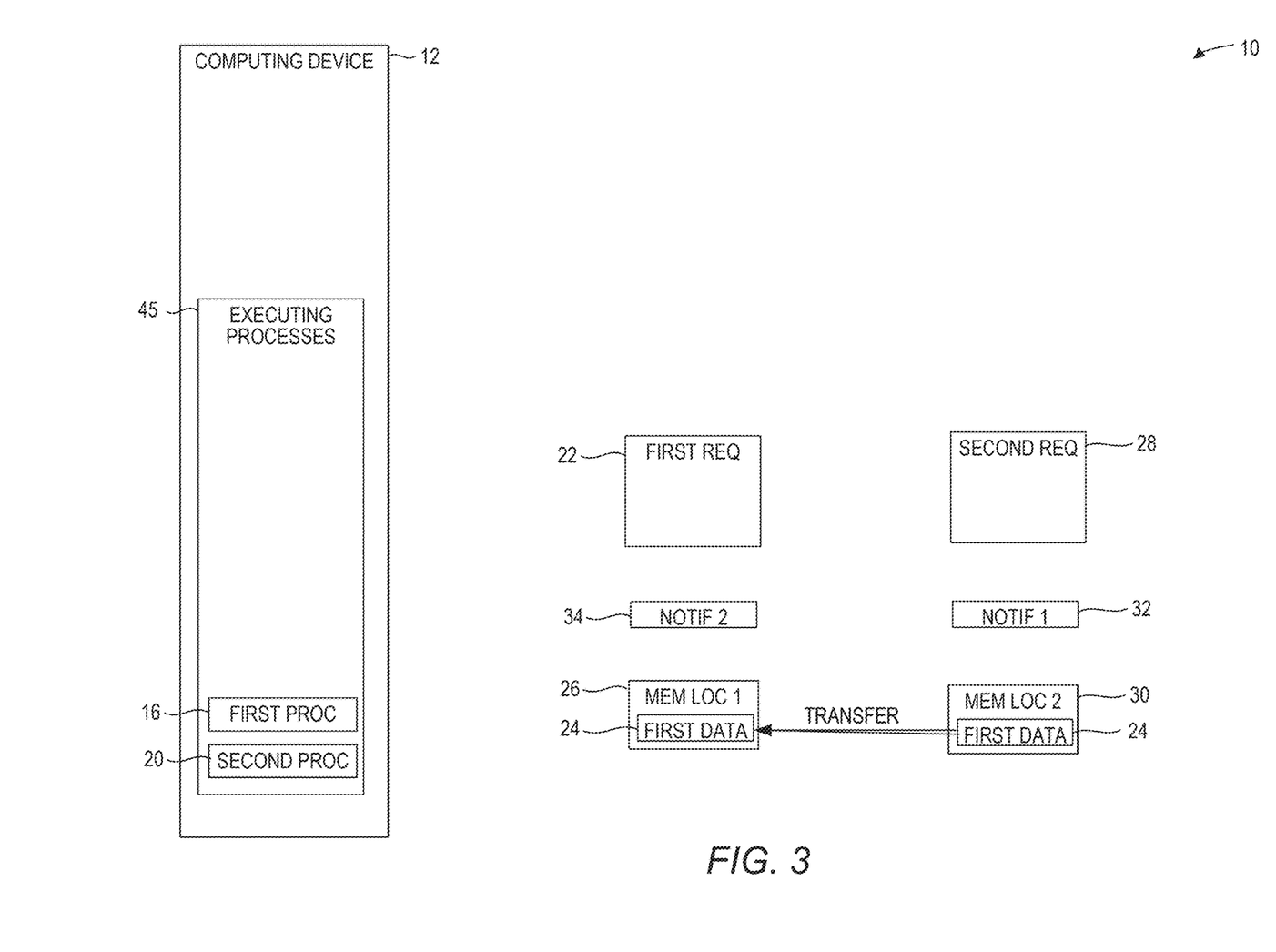
FIG. 3 is a simplified block diagram of the environment illustrated in FIG. 1 according to one implementation.

FIG. 3 is a simplified block diagram of the environment illustrated in FIG. 1 according to one implementation. A computing system 10 can comprise one or more computing devices 12. A computing device 12 can allocate a first-process memory area 14 to a first process 16, and can allocate a second-process memory area 18 to a second process 20. The computing device 12 can receive, from the first process 16, a first request 22 for the second process 20 to write first data 24 to a first memory location 26. The computing device 12 can provide, to the second process 20, a second request 28 for the second process 20 to write the first data 24 to a second memory location 30. The computing device 12 can receive, from the second process 20, a first notification 32 indicating that the second process 20 has written the first data 24 to the second memory location 30. The computing device 12 can transfer the first data 24 from the second memory location 30 to the first memory location 26. The computing device 12 can provide a second notification 34 to the first process 16 indicating that the first data 24 has been written to the first memory location 26.

In some implementations, the parts depicted in FIG. 3 can be, comprise, be comprised by, share similar (e.g., same) properties or operate in a manner similar to (e.g., same as) one or more examples set forth in the description of FIG. 1 with respect to parts sharing a similar (e.g., same) name and part number.

Figure 4:
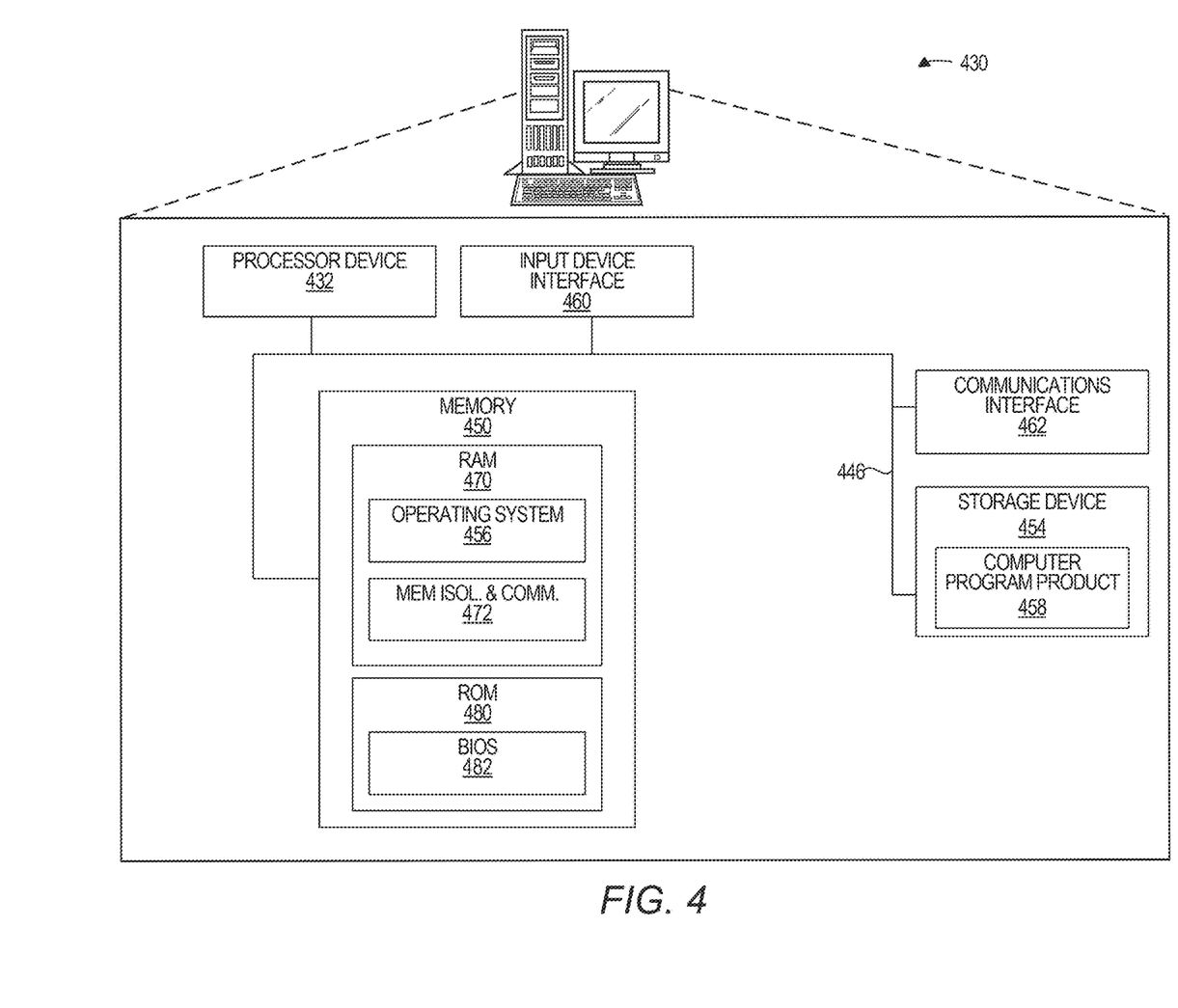
FIG. 4 is a block diagram of a computing device suitable for implementing examples according to one example.

FIG. 4 is a block diagram of the computing device 430 suitable for implementing examples according to one example. The computing device 430 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 430 includes the processor device 432, the system memory 450, and a system bus 446. The system bus 446 provides an interface for system components including, but not limited to, the system memory 450 and the processor device 432. The processor device 432 can be any commercially available or proprietary processor.

In some instances, the computing device 430 can be, comprise, be comprised by, or otherwise share one or more properties with a computing device 12. For example, a computing device 12 can have any property described herein with respect to a computing device 430.

The system bus 446 may be any of several types of bus structures that may further interconnect to a memory bus (with or without a memory controller), a peripheral bus, and/or a local bus using any of a variety of commercially available bus architectures. The system memory 450 may include non-volatile memory 480 (e.g., read-only memory (ROM), erasable programmable read-only memory (EPROM), electrically erasable programmable read-only memory (EEPROM), etc.), and volatile memory 470 (e.g., random-access memory (RAM)). A basic input/output system (BIOS) 482 may be stored in the non-volatile memory 480 and can include the basic routines that help to transfer information between elements within the computing device 430. The volatile memory 470 may also include a high-speed RAM, such as static RAM, for caching data.

The computing device 430 may further include or be coupled to a non-transitory computer-readable storage medium such as the storage device 454, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 454 and other drives associated with computer-readable media and computer-usable media may provide non-volatile storage of data, data structures, computer-executable instructions, and the like.

A number of modules can be stored in the storage device 454 and in the volatile memory 470, including an operating system 456 and one or more program modules, such as a memory isolation and communication module 472, which may implement the functionality described herein in whole or in part. All or a portion of the examples may be implemented as a computer program product 458 stored on a transitory or non-transitory computer-usable or computer-readable storage medium, such as the storage device 454, which includes complex programming instructions, such as complex computer-readable program code, to cause the processor device 432 to carry out the steps described herein. Thus, the computer-readable program code can comprise software instructions for implementing the functionality of the examples described herein when executed on the processor device 432. The processor device 432, in conjunction with the memory isolation and communication module 472 in the volatile memory 470, may serve as a controller, or control system, for the computing device 430 that is to implement the functionality described herein.

An operator, such as a user, may also be able to enter one or more configuration commands through a keyboard (not illustrated), a pointing device such as a mouse (not illustrated), or a touch-sensitive surface such as a display device. Such input devices may be connected to the processor device 432 through an input device interface 460 that is coupled to the system bus 446 but can be connected by other interfaces such as a parallel port, an Institute of Electrical and Electronic Engineers (IEEE) 1394 serial port, a Universal Serial Bus (USB) port, an IR interface, and the like. The computing device 430 may also include the communications interface 462 suitable for communicating with the network (e.g., internet, etc.) as appropriate or desired. The computing device 430 may also include a video port to interface with the display device, to provide information to the user.

Individuals will recognize improvements and modifications to the preferred examples of the disclosure. All such improvements and modifications are considered within the scope of the concepts disclosed herein and the claims that follow.

What is claimed is:

1. A method comprising:
   receiving, by a computing system comprising one or more computing devices, from a first process executing on the computing system, a first request for first data to be written to a first memory location of the computing system by a second process executing on the computing system, wherein the second process does not have write access to the first memory location;
   providing, by the computing system to the second process, a second request for the first data to be written by the second process to a second memory location of the computing system, wherein the second process has write access to the second memory location;

receiving, by the computing system from the second process, a first notification indicating that the second process has written the first data to the second memory location;

transferring, by the computing system, the first data from the second memory location to the first memory location; and providing, by the computing system to the first process, a second notification indicating that the first data has been written to the first memory location.

2. The method of claim 1, further comprising:

receiving, by the computing system from the first process, a third notification indicating that second data has been written to a third memory location for use by the second process, wherein the second process does not have read access to the third memory location;

transferring, by the computing system, the second data to a fourth memory location, wherein the first process has read access to the fourth memory location; and providing, by the computing system to the second process, a fourth notification indicating that the second data has been written to the fourth memory location.

3. The method of claim 1, wherein receiving the first request comprises:

monitoring, by the computing system, a first request buffer in a first memory area associated with the first process; and receiving, by the computing system from the first process, a data item indicative of the first request in the first request buffer, wherein the data item comprises second data indicative of the first memory location and third data indicative of one or more other request parameters.

4. The method of claim 3, wherein providing the second request comprises:

generating, by the computing system, a data item indicative of the second request comprising the third data and fourth data indicative of the second memory location; and writing, by the computing system, the data item indicative of the second request to a second request buffer in a second memory area associated with the second process.

5. The method of claim 4, wherein the second request consists of identical data in an identical format compared to the data item indicative of the first request, except that the second data indicative of the first memory location is replaced by the fourth data indicative of the second memory location.

6. The method of claim 3, wherein the third data comprises identification data indicative of the first data.

7. The method of claim 3, wherein receiving the first notification comprises:

monitoring, by the computing system, a first notification buffer in a second memory area associated with the second process; and receiving, by the computing system from the second process, a notification data item in the first notification buffer, the notification data item comprising data indicating that the second request has been fulfilled.

8. The method of claim 7, wherein providing the second notification comprises:

transferring, by the computing system, the notification data item to a second notification buffer in the first memory area associated with the first process.

9. The method of claim 1, wherein the first memory location is located in a first data buffer associated with the first process, and the second memory location is located in a second data buffer associated with the second process.

10. The method of claim 1, further comprising:

allocating, by the computing system, a first memory area comprising the first memory location to the first process; and allocating, by the computing system, a second memory area comprising the second memory location to the second process.

11. The method of claim 10, wherein allocating the second memory area comprises:

allocating, by the computing system, the second memory area as shared memory accessible to the second process and a virtual machine monitor executing on the computing system.

12. The method of claim 10, wherein the first process comprises a first virtual machine, the first memory area comprises a first virtual memory area mapped to a first physical memory area, and further comprising:

allocating, by the computing system, a third memory area to a second virtual machine, wherein the third memory area comprises a second virtual memory area mapped to a second physical memory area; and mapping, by the computing system, a portion of the second virtual memory area to a portion of the first physical memory area, wherein data associated with the portion of the second virtual memory area is identical to data stored in the portion of the first physical memory area.

13. The method of claim 12, further comprising:

removing, by the computing system, the portion of the second virtual memory area from the second physical memory area.

14. The method of claim 12, further comprising:

updating, by the computing system, a configuration setting associated with the portion of the first physical memory area;

copying, by the computing system based on the configuration setting responsive to an update request from the first virtual machine or the second virtual machine to update the portion of the first physical memory area, the data stored in the portion of the first physical memory area to a portion of the second physical memory area;

mapping, by the computing system, the portion of the second virtual memory area to the portion of the second physical memory area; and updating, by the computing system based on the update request, at least one of the first physical memory area and the second physical memory area.

15. The method of claim 10, further comprising:

determining, by the computing system, that the second memory area has insufficient space; and allocating, by the computing system based on the determining, a third memory area to the second process.

16. The method of claim 1, wherein the second process comprises a device emulation process to emulate a virtual hardware device.

17. The method of claim 16, wherein the virtual hardware device comprises at least one of:

a virtual storage device; and a virtual input/output device.

18. The method of claim 17, wherein the first process comprises a device driver executing on a virtual machine, and the first request is generated by the device driver.

19. A computing system comprising:
one or more computing devices to:
- receive, from a first process executing on the computing system, a first request for first data to be written to a first memory location of the computing system by a second process executing on the computing system, wherein the second process does not have write access to the first memory location;
- provide, to the second process, a second request for the first data to be written by the second process to a second memory location of the computing system, wherein the second process has write access to the second memory location;
- receive, from the second process, a first notification indicating that the second process has written the first data to the second memory location;
- transfer the first data from the second memory location to the first memory location; and
- provide, to the first process, a second notification indicating that the first data has been written to the first memory location.

20. A non-transitory computer-readable storage medium that includes executable instructions to cause one or more processor devices to:
- receive, from a first process executing on a computing system comprising the one or more processor devices, a first request for first data to be written to a first memory location of the computing system by a second process executing on the computing system, wherein the second process does not have write access to the first memory location;
- provide, to the second process, a second request for the first data to be written by the second process to a second memory location of the computing system, wherein the second process has write access to the second memory location;
- receive, from the second process, a first notification indicating that the second process has written the first data to the second memory location;
- transfer the first data from the second memory location to the first memory location; and
- provide, to the first process, a second notification indicating that the first data has been written to the first memory location.

* * * * *